United States Patent
Matousek et al.

(10) Patent No.: US 10,642,714 B2
(45) Date of Patent: May 5, 2020

(54) MAPPING DYNAMIC ANALYSIS DATA TO SOURCE CODE

(71) Applicant: MICROSOFT TECHNOLOGY LICENSING, LLC, Redmond, WA (US)

(72) Inventors: Tomas Matousek, Redmond, WA (US); John Lawrence Hamby, Port Townsend, WA (US); Manish Kumar Jayaswal, Redmond, WA (US); Andrew Michael Casey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/454,912

(22) Filed: Mar. 9, 2017

(65) Prior Publication Data
US 2018/0260304 A1   Sep. 13, 2018

(51) Int. Cl.
*G06F 11/36* (2006.01)

(52) U.S. Cl.
CPC ...... *G06F 11/3612* (2013.01); *G06F 11/3624* (2013.01); *G06F 11/3644* (2013.01)

(58) Field of Classification Search
CPC .... G06F 11/3688; G06F 8/36; G06F 11/3612; G06F 11/3624; G06F 11/3644
See application file for complete search history.

(56) References Cited

U.S. PATENT DOCUMENTS

| | | | |
|---|---|---|---|
| 5,581,696 A | 12/1996 | Kolawa et al. | |
| 5,790,858 A | 8/1998 | Vogel | |
| 5,987,249 A | 11/1999 | Grossman et al. | |
| 6,085,029 A | 7/2000 | Kolawa et al. | |
| 6,434,741 B1 * | 8/2002 | Mirani | G06F 11/3628 714/E11.209 |
| 6,662,362 B1 * | 12/2003 | Arora | G06F 8/4441 714/E11.209 |
| 7,047,521 B2 | 5/2006 | Bunnell | |
| 2002/0016918 A1 * | 2/2002 | Tucker | G06F 21/14 713/190 |
| 2004/0015953 A1 * | 1/2004 | Vincent | G06F 8/65 717/173 |
| 2005/0039187 A1 | 2/2005 | Avakian et al. | |
| 2006/0048114 A1 | 3/2006 | Schmidt | |

(Continued)

OTHER PUBLICATIONS

David, "Incompatibility with Cudafy.Net", http://forum.ncrunch.net/yaf_postsm5944_Incompatibility-with-Cudafy-Net.aspx, Retrieved on: Jan. 11, 2017, 2 pages.

(Continued)

*Primary Examiner* — Viva Miller
(74) *Attorney, Agent, or Firm* — Rainier Patents, P.S.

(57) ABSTRACT

Metadata tables can provide the link between the instrumentation information collected and the location in the source code of the programming language construct that was instrumented. The metadata tables enable the relationship between the programming construct in the source code and the dynamic analysis information collected to be exact rather than an estimate. During compilation information is collected that enables a mapping between document table and analysis table to occur.

19 Claims, 5 Drawing Sheets

(56) References Cited

U.S. PATENT DOCUMENTS

| | | | |
|---|---|---|---|
| 2007/0180439 A1* | 8/2007 | Sundararajan | G06F 11/3644 717/158 |
| 2009/0024986 A1 | 1/2009 | Meijer et al. | |
| 2009/0178031 A1 | 7/2009 | Zhao | |
| 2010/0037101 A1 | 2/2010 | Zakonov et al. | |
| 2012/0079460 A1 | 3/2012 | Cho et al. | |
| 2012/0246627 A1 | 9/2012 | Partridge et al. | |
| 2012/0265824 A1 | 10/2012 | Lawbaugh | |
| 2016/0259636 A1* | 9/2016 | Plate | G06F 8/68 |
| 2017/0090874 A1 | 3/2017 | Blumenau | |
| 2018/0260197 A1 | 9/2018 | Tsingauz et al. | |
| 2018/0260198 A1 | 9/2018 | Hamby et al. | |

OTHER PUBLICATIONS

"Instrumenting and Compiling the Source Code", https://www.ibm.com/support/knowledgecenter/en/SSSHUF_8.0.0/com.ibm.rational.testrt.studio.doc/topics/tclicompile.htm, Retrieved on: Jan. 11, 2017, 2 pages.

Baxter, Ira. D., "Branch Coverage for Arbitrary Languages Made Easy: Transformation Systems to the Rescue!", http://www.semdesigns.com/Company/Publications/TestCoverage.pdf, Published on: Jan. 23, 2002, 6 pages.

"Ada code instrumentation as GNAT compilation part?", https://web.archive.org/web/20141005202153/http:/stackoverflow.com/questions/22111437/ada-code-instrumentation-as-gnat-compilation-part, Published on: Oct. 5, 2014, 2 pages.

"Adding source instrumentation code—Is source-to-source compiler right approach? How to build one?", https://web.archive.org/web/20140922144558/http:/stackoverflow.com/questions/12969420/adding-source-instrumentation-code-is-source-to-source-compiler-right-approach, Published on: Sep. 22, 2014, 2 pages.

Luk, et al., "Pin: Building Customized Program Analysis Tools with Dynamic Instrumentation", In Proceedings of ACM Sigplan Notices, vol. 40, No. 6, Jun. 12, 2005, 11 pages.

"Dynamic code analysis", http://www.viva64.com/en/t/0070/, Published on: Jan. 31, 2013, 5 pages.

Brais, Hadi, "Application Instrumentation: Application Analysis with Pin", https://msdn.microsoft.com/en-us/magazine/dn818497.aspx, Published on: Nov. 2014, 16 pages.

Allen, et al., "Computational Science—ICCS 2009: 9th International Conference Baton Rouge", In Proceedings of 9th International Conference Baton Rouge, May 25, 2009, 2 pages.

Larus, et al., "Rewriting executable files to measure program behavior", In Journal of Software: Practice and Experience, vol. 24, Issue 2, Feb. 1994, pp. 197-218.

"Profiling (computer programming)", https://en.wikipedia.org/wiki/Profiling_(computer_programming), Retrieved on: Feb. 27, 2017, 6 pages.

Srivastava, et al., "ATOM: A System for Building Customized Program Analysis Tools", In WRL Research Report 94/2, Mar. 1994, 27 pages.

U.S. Appl. No. 15/454,990, Hamby, et al., "Instrumenting Program Code", filed Mar. 9, 2017.

U.S. Appl. No. 15/454,949, Tsingauz, et al., "Extensible Instrumentation", filed Mar. 9, 2017.

"Non Final Office Action Issued in U.S. Appl. No. 15/454,949", dated Aug. 7, 2018, 31 Pages.

"Non Final Office Action Issued in U.S. Appl. No. 15/454,990", dated Apr. 5, 2018, 31 pages.

"Final Office Action Issued in U.S. Appl. No. 15/454,949", dated Dec. 5, 2018, 40 pages.

"Final Office Action Issued in U.S. Appl. No. 15/454,990", dated Sep. 20, 2018, 24 pages.

"Non Final Office Action Issued in U.S. Appl. No. 15/454,949", dated May 21, 2019, 44 Pages.

"Non-Final Office Action Issued in U.S. Appl. No. 15/454,990", dated Jan. 9, 2020, 26 Pages.

* cited by examiner

FIG. 4

MAPPING DYNAMIC ANALYSIS DATA TO SOURCE CODE

CROSS-REFERENCE TO RELATED APPLICATIONS

The application is related in subject matter to co-pending U.S. patent application Ser. No. 15/454,990 entitled "INSTRUMENTING PROGRAM CODE", filed on Mar. 9, 2017. The application is related in subject matter to co-pending U.S. patent application Ser. No. 15/454,949 entitled "EXTENSIBLE INSTRUMENTATION", filed on Mar. 9, 2017.

BACKGROUND

Instrumentation is a technique in which instructions are added to a program to collect information when the program runs. Typically, the information collected relates to performance or other behavioral characteristics of the program. A program can be instrumented manually (meaning that the instructions are added, usually to the source code, by a person). A program can be instrumented automatically, by another program (e.g., by a compiler, etc.). Instrumentation can be added to the source code, to byte code or to a compiled binary. Code can be instrumented as the source code is developed. Code can be instrumented right before execution (runtime instrumentation).

SUMMARY

Metadata tables can provide the link between instrumentation information collected and a programming language construct in a program associated with instrumentation. Instrumentation information can be used for dynamic analysis, such as but not limited to code coverage and test impact analysis. The metadata tables enable the relationship between the programming language construct in the source code and the dynamic analysis information collected to be exact rather than an estimate. During compilation, information is collected that enables a mapping between a document table that stores the name of the program and the location of the programming language construct in the source code and an analysis table that stores the analysis data collected at execution to occur.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

No known approach to automated instrumentation enables the exact mapping of source code to dynamic analysis information collected.

The subject matter disclosed herein addresses the automated instrumentation of computer programs to collect data that can be used to determine dynamic characteristics of a program. Dynamic characteristics are characteristics of runtime behavior. Examples include but are not limited to: which statements of a program execute, how many times does a particular statement execute, how many times does a particular method execute, what is the set of actual receiver types for each virtual method call in a program, what is the size of an array allocated for an array creation expression, what is the maximum call stack depth at each method call site, what is the set of actual types encountered at each cast, are there patterns in traces of execution paths (e.g., does the path taken in one if statement correlate with the path taken in another if statement) and so on.

In accordance with aspects of the subject matter disclosed herein, during compilation, data is collected that specifies where in the source code a programming language construct is located. In accordance with some aspects of the subject matter disclosed herein, the programming language construct can be instrumented during the compilation process. Dynamic analysis information for the programming language construct can be collected when the instrumented binary is run. Metadata tables can be maintained that enable the exact mapping of source code to dynamic analysis information collected. Each instrumentation point can be assigned a sequential number. When instrumentation code is inserted into the code of a method, an entry in a document table for the method can be made, the entry comprising a description of the source location of the programming language construct instrumented during compilation. Programming language constructs can be identified that correspond to particular parts of program structure including but not limited to: a statement, invocation, basic block, expression, method, subroutine, global function, class constructor, operator or any sequence of instructions as identified by the instrumentation information provided to the compiler at compile time.

In accordance with some aspects of the subject matter, the number assigned to the instrumentation is used to correlate the source location stored in the document table with the corresponding entry in the analysis table. In accordance with some aspects of the subject matter described herein, methods are used as containers with which analysis tables are associated. The method container can include programming language constructs which can be instrumented.

The instrumentation number can be used as an index into the analysis table for the method for which dynamic analysis information is collected. When the code is executed, an entry in the method's analysis table can be made, the entry comprising the analysis data captured by executing the instrumentation code that was inserted by the compiler. In accordance with some aspects of the subject matter disclosed herein, tables are organized so that each method has its own analysis table and document table, however, the subject matter disclosed herein is not so limited and other partitioning schemes are contemplated. For example, an analysis table and/or document table can be created and updated for other instrumented code containers, such as but not limited to a type declaration or the entire program.

For example, suppose the desired dynamic analysis comprises determining which statements in a program actually execute. In this case, instrumentation code can be inserted for every statement of the source code into the code representing the program. For each statement of the source code, an incremented entry into an instrumentation table can be made, (e.g., the first statement would have an index of 1, the second statement would have an index of 2 and so on). In this case, the cells of the table can be Boolean values, initialized to "false". If the injected code for a particular statement executes, the row of the table with the corresponding index can be set to true. For example, if the first statement (with index=1) executes, the cell for index=1 of the analysis table can be set to true. If the second statement (with index=2) does not execute, the cell of the table with index=2 would remain false.

Mapping Dynamic Analysis Data to Source Code

A compiler is a computer program (or a set of programs sometimes referred to as a compiler chain) that translates source code written in a programming language into another form, typically into a compiled binary that is consumable by a real or virtual machine (i.e., a binary is code that can be executed by a computer).

Compilers often are described as having a front end, a middle end and a back end. The front end includes lexical analysis, syntax analysis, and semantic analysis. The output of the front end is an intermediate representation (IR) of the source code for processing by the middle end. In the broadest sense, IR is any form that a program takes between the input to a compiler (typically source code in a programming language) and the output from a compiler (typically a compiled binary that can be executed by a computer). In practice IR is assumed to include semantic information as well as syntactic information (e.g., it would be unconventional to refer to the token stream produced by the lexical analyzer as an IR). An intermediate representation (IR) is the data structure or code used internally by a compiler or virtual machine to represent source code. A good IR is conducive to optimization and translation.

Compilers typically operate in multiple phases. For example, phases for the front end may include a lexical analysis phase which converts the source code text into tokens, which are atomic units of the programming language. Examples of tokens include identifiers, key words, numeric literals and operators. During the syntax analysis phase, the token sequence is parsed to create a parse tree or syntax tree adhering to the rules of a formal grammar defining the syntax of the language. The parse tree is often analyzed, augmented, and transformed by later phases in the compiler.

In the semantic analysis phase(s) the compiler creates new trees including semantic information or adds semantic information to the parse tree and builds the symbol table. Semantic analysis can include type checking, object binding (associating variable and function references with their definitions to the syntax tree), checking that all local variables are initialized before use and so on. Warnings and error messages are typically produced during semantic analysis. Semantic analysis typically follows the parsing phase, and precedes the code generation phase.

The middle end can perform optimizations on a form other than the source code or machine code. The middle end performs optimizations such as removal of useless or unreachable code and moves code around to make execution more efficient. The middle end may generate another type of IR for input to the back end.

The back end takes the output from the middle end. The back end may perform additional analyses and optimizations designed for a particular computer architecture. The back end can generate target-dependent output.

Figure 1A:
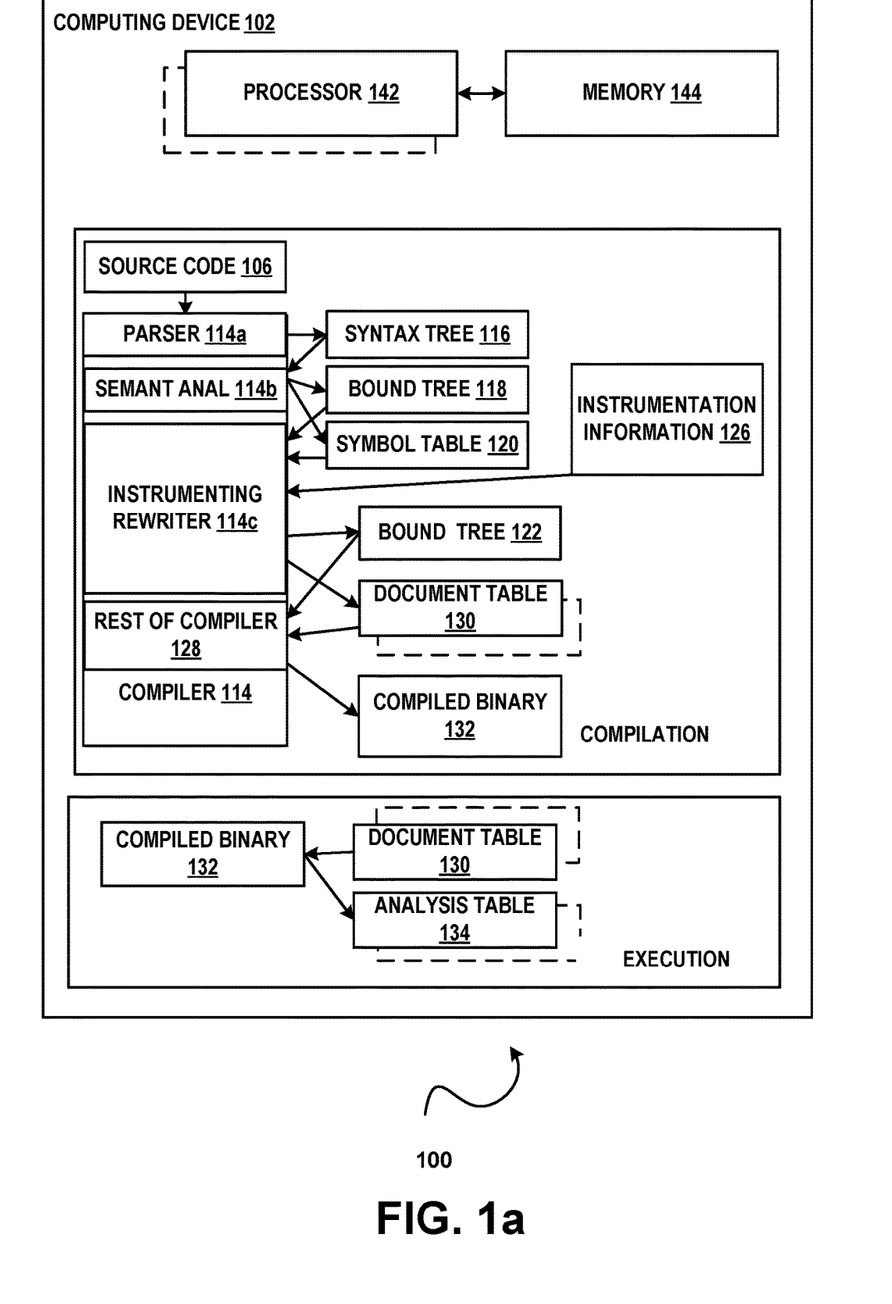
FIG. 1a is a block diagram illustrating an example of a system 100 for mapping a programming language construct in source code to dynamic analysis information collected in accordance with aspects of the subject matter disclosed herein.

FIG. 1a is a block diagram illustrating an example of a system in which metadata tables enable the exact mapping of the location of a programming language construct in the source code to the dynamic analysis data captured in accordance with aspects of the subject matter disclosed herein. All or portions of system 100 may reside on one or more computers or computing devices such as the computers described below with respect to FIG. 3.

System 100 may execute wholly or partially within an IDE or can execute wholly or partially outside an IDE. An IDE can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 can be an on-premises system.

System 100 can include one or more computing devices. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102 can include one or more processors such as processor 142, etc., and a memory such as memory 144 that communicates with the one or more processors.

System 100 may include one or more program modules that when loaded into the memory and accessed by the one or more processors cause the processor to perform the action or actions attributed to the one or more program modules. The processor(s) may be configured to perform the action or actions attributed to the one or more program modules. System 100 may include any one of or any portion of or any combination of any number of the following: a compiler or portion of a compiler such as compiler 114. Compiler 114 may include a parsing module such as parser 114a. Compiler 114 may include a semantic analyzing module such as semantic analyzer 114b. Compiler 114 may include an instrumenting rewriter such as instrumenting rewriter 114C. An instrumenting rewriter such as instrumenting rewriter 114c can instrument the program. In accordance with some aspects of the subject matter disclosed herein the instrumenting rewriter 114c may rewrite higher level language constructs into lower level language constructs in IR.

Compiler 114 can receive source code 106 written in any programming language. Parser 114a may create a parse tree or syntax tree such as syntax tree 116 from the source code 106. Semantic analyzer 114b may receive the syntax tree 116 and create a bound tree such as bound tree 118. Semantic analyzer 114b may create a symbol table such as symbol table 120.

In accordance with aspects of the subject matter described herein, a local instrumenting module such as module 114c can receive the symbol table 120, the bound tree 118, and instrumentation information 126 that specifies: a programming construct to instrument and code that when executed collects the information desired. In accordance with some aspects of the subject matter disclosed herein, recognition of instrumentation-eligible language constructs and insertion of the code to perform the instrumentation can occur during the front end of compilation before code generation, while the output is quite similar to the original source code. From the bound tree 118, and the symbol table 120, and the instrumentation information 126 the instrumenting module 114c can create instrumented code such as bound tree 122.

The instrumenting module 114c may also rewrite higher level programming language constructs into lower level programming language constructs to create a lowered instrumented bound tree (not shown). The instrumenting rewriter 114c may also generate information concerning the location of the instrumented programming language construct in the source code (e.g., one or more document tables such as document table 130 in FIG. 1a). The instrumented bound tree 122 and the document table(s) 130, etc. can be provided to the rest of the compiler chain 128. The rest of the compiler chain 128 can generate a compiled binary such as compiled binary 132. The document table(s) 130, etc. can be included in the compiled binary 132. The document table(s) 130, etc. can be in a separate file that is associated with the compiled binary 132. At execution time, the compiled binary 132 can collect the runtime behavior information in one or more analysis tables such as analysis table 134, etc. specified by the inserted instrumentation.

Figure 1B:
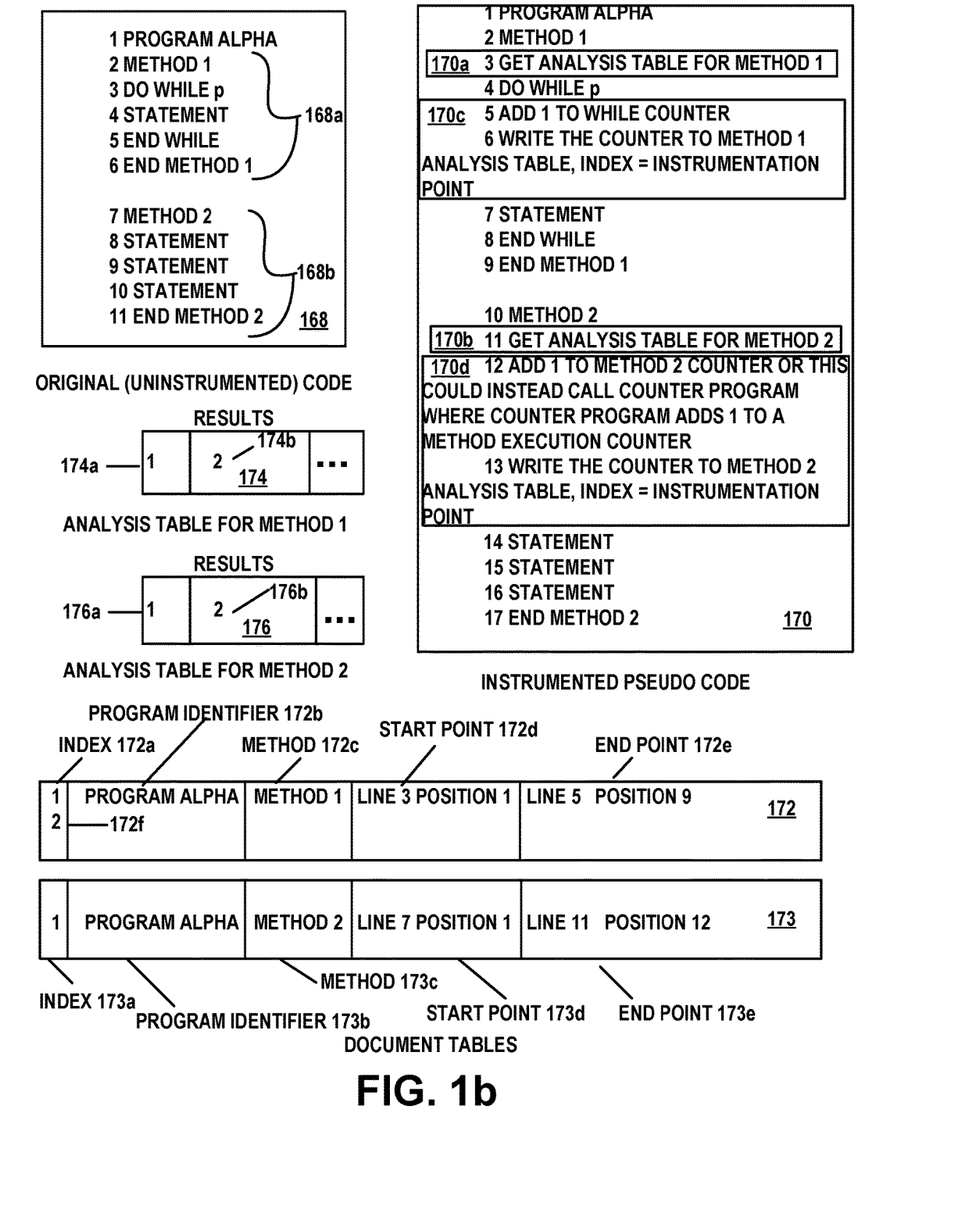
FIG. 1b is a block diagram illustrating an example of pseudo code for an original un-instrumented program, 168, pseudo code for the instrumented program 170, document tables 172, 173 and an analysis tables 174, 176 in accordance with aspects of the subject matter disclosed herein.

FIG. 1b code block 168 illustrates an example of pseudo code for original un-instrumented source code that includes two methods, Method 1 168a and Method 2 168b. FIG. 1b instrumented pseudo code block 170 illustrates the instrumented pseudo code. In accordance with some aspects of the subject matter disclosed herein, at the beginning of each instrumented method, code is inserted that can access a table (e.g., an array) in which to store the analysis data (e.g., pseudo code line 3 170a and pseudo code line 11 170b of instrumented pseudo code block 170).

Consider one type of instrumentation which counts how many times the DO WHILE loop of Method 1 168a (original un-instrumented pseudo code lines 3-5) executes and another instrumentation instruments code to count how many times Method 2 168b executes (original un-instrumented pseudo code lines 7-11). The instrumentation can be added to the code where indicated. For example, In FIG. 1b for the first instrumentation to Method 1, instrumentation code has been added after the DO WHILE statement on line 3 in the original un-instrumented pseudo code. In the instrumented code, code block 170, the instrumentation appears on lines 5-6, instrumentation 170c. Other instrumentation code for Method 2 has been added after line 7 (Method 2 168b) of the original pseudo code program code block 168. The instrumentation appears in the instrumented pseudo code on lines 12-13, instrumentation 170d.

The instrumenting module can increment an index counter and create an entry in the document table 172 for the instrumentation. As counting how many times the DO WHILE loop in Method 1 is executed is the first instrumentation for Method 1, the index 172a into the document table 172 for Method 1 is 1. The index for the next instrumentation will be incremented, (e.g., having an index of 2, 172f) and so on. The columns of the document table can include the identifier of the source program 172b, the name of the method (method 172c) and text span in the source code of the programming language construct (e.g., a character position such as but not limited to a start point 172d and end point 172e, or an offset from the beginning of the source code file) of the construct that was instrumented. The cells for the first instrumentation (INDEX=1) include the identifier of the source program (ALPHA), the identifier of the method (METHOD 1) and start point (LINE 3 POSITION 1) and end point (LINE 5 POSITION 9) of the construct that was instrumented. The cells of the document table (e.g., document table 173) for the Method 2 instrumentation (INDEX=1 173a) include the identifier of the source program (ALPHA 173b), the identifier of the method (METHOD 2 173c) and start point (LINE 7 POSITION 1 173d) and end point (LINE 11 POSITION 12 173e) of the text span in the source code at which the construct is found. It will be appreciated that a method can have more than one set of document and analysis tables because each type of instrumentation can apply to a different type of programming language construct.

When the program runs, the inserted call can be executed to see if the method already has an analysis table allocated. If such a table exists, it can be returned. Otherwise a table can be allocated and returned. The inserted instrumentation code can be executed and the results can be stored in the analysis table. For example, the first time the DO WHILE loop is executed, the initialized value of the table (0) is returned, is incremented by one and the incremented value (1) is stored in the analysis table for Method 1, table 174, cell 174a. The next time the DO WHILE loop is executed, the current value of the table (1) is returned, is incremented by one and the incremented value (2) is stored in the analysis table (cell 174b) and so on. Similarly, the first time Method 2 is executed, the initialized value of the table (0) is returned, is incremented by one and the incremented value (1) is stored in the analysis table for Method 2 176, cell 176a. The next time Method 2 is executed, the current value of the table (1) is returned, is incremented by one and the incremented value (2) is stored in the analysis table for Method 2 176 cell 176b and so on.

At the end of the execution of the program ALPHA, the results column of the analysis table for Method 1 174 will show the number of times the DO WHILE loop was executed. At the end of the execution of the program ALPHA the results column of the analysis table for Method 2 176 will show the number of times Method 2 was executed. This information can be displayed to the user while the program is executing in any suitable manner, as is known in the art.

To determine exactly where in the source code the instrumentation was inserted the index of the instrumentation in the analysis table of the including method is used as the index into the document table entries corresponding to the method to obtain the location in the source code of the programming language construct that was instrumented.

Figure 2:
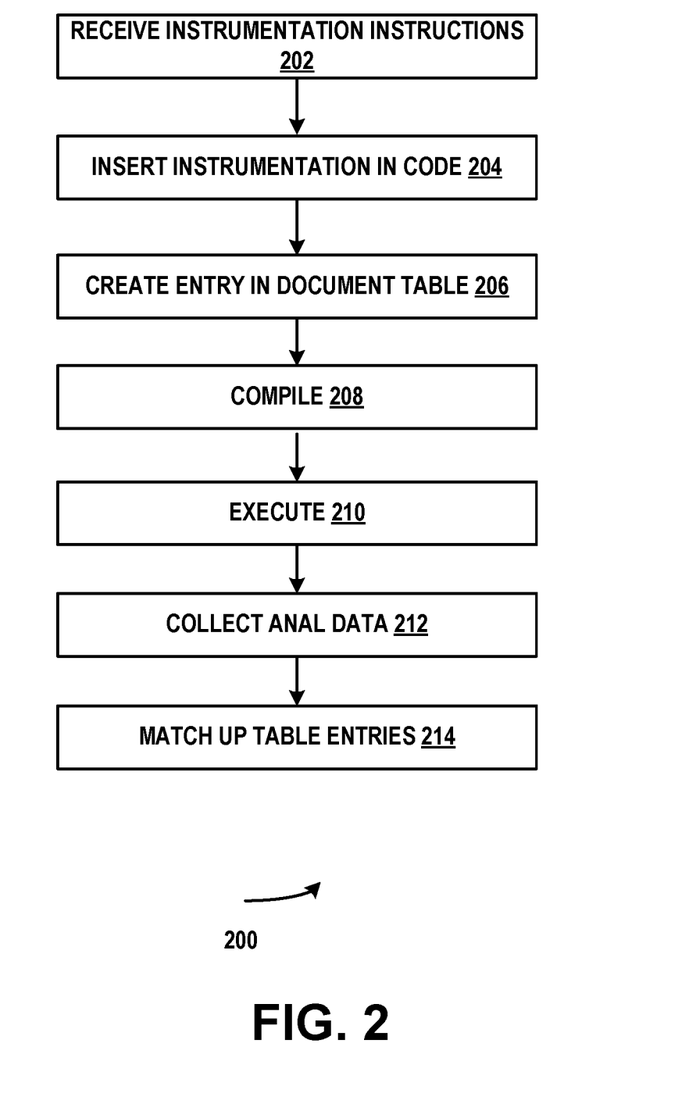
FIG. 2 is a flow diagram of an example of a method 200 for mapping a programming language construct in source code with data analysis information collected in accordance with aspects of the subject matter disclosed herein.

FIG. 2 is a flow diagram of an example of a method for instrumenting source code in accordance with aspects of the subject matter disclosed herein. The method described in FIG. 2 can be practiced by a system such as but not limited to the one described with respect to FIG. 1a. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202 a compiler can receive instructions for instrumenting a programming language construct. The instructions can include a programming language construct to be instrumented and the instrumentation to be performed. At operation 204 the instrumentation code can be inserted into the code. At operation 206 when the identified programming construct is found during compilation processing, an entry can be made into a document table for the method that indicates where in the source the construct was found. The first instrumentation of each method can be assigned an index of 1. At operation 206 the index can be incremented. The process can repeat until all instrumentations are applied for all the methods. At operation 208 the instrumented program can be compiled. At operation 210 the program can be run. When the program is run, analysis results can be collected at operation 212. At operation 214, using the index assigned to the instrumentation for the method, the results can be placed in an analysis table which can be mapped to the corresponding index in the document table for the method to determine the exact location of the instrumented programming construct in the source code. For each method, the compiler creates a table of text spans describing the instrumentation points in exact correspondence with the method's analysis data. That is, for each method M, element N in the document table part corresponding to M describes the text span for the instrumentation point represented by element N in the analysis table of method M.

Described herein is a front-end compiler, comprising an instrumenting module configured to receive information identifying at least one programming construct in a source code file, receive the instrumentation to be performed on the at least one programming construct in the source code file, insert the instrumentation into a representation of the source code file and insert into a document table an identifier of the source code file and a location in the source code file comprising a location at which the at least one programming construct was found in the source code file. The document table can comprise a source code file identifier. The location in the source code file can comprise a character position. The location can comprise a line and a column. The location can comprise a character offset from start of file. The instrumenting module can collecting dynamic analysis information for the instrumented programming language construct at execution. An element N in the document table can correspond to a method M and can describe a text span for an instrumentation point represented by element N in an analysis table for the method M. An instrumentation point can receive a sequential number.

Described herein is a method of matching analysis data to a location in a source code program comprising receiving a document table, the document table comprising an identifier of a source code program, a method, and a text span representing a location of a programming language construct in the source code program, the programming language construct comprising an instrumented programming language construct, storing dynamic analysis data collected during execution of the instrumented programming language construct in an analysis table indexed by instrumentation point; and matching an index of the document table and an index of the analysis table to determine an exact location of the programming language construct in the source code program. The document table can comprise a source code identifier and a method name and location information for the instrumented programming language construct in the source code program. Each method can be associated with a set of tables, a set of tables comprising a document table and an analysis table. Each method can be associated with a plurality of sets of tables, each set comprising a document table and an analysis table. The analysis table can be updated with dynamic analysis information collected during execution of instrumentation. The document table can include an identifier of the source code file and a location in the source code corresponding to a location at which the instrumentation was inserted Described herein is a device for exactly matching analysis results with location in a source code file comprising a memory, a processor, the processor configured to match instrumentation data collected at runtime to an exact location in the source code at which a programming language construct is found. The device can receive a document table. The device can store instrumentation data collected at runtime in an analysis table. An index for the instrumentation data in the analysis table can be used as the index into the document table to retrieve an exact location of the programming language construct in the source code, the programming language constructed instrumented at compile time. A text span in the source code file at which the programming language construct is found can be provided. The device can map instrumentation results to a location in a source code using a document table and an analysis table.

Exemplary Operating Environment

Figure 3:
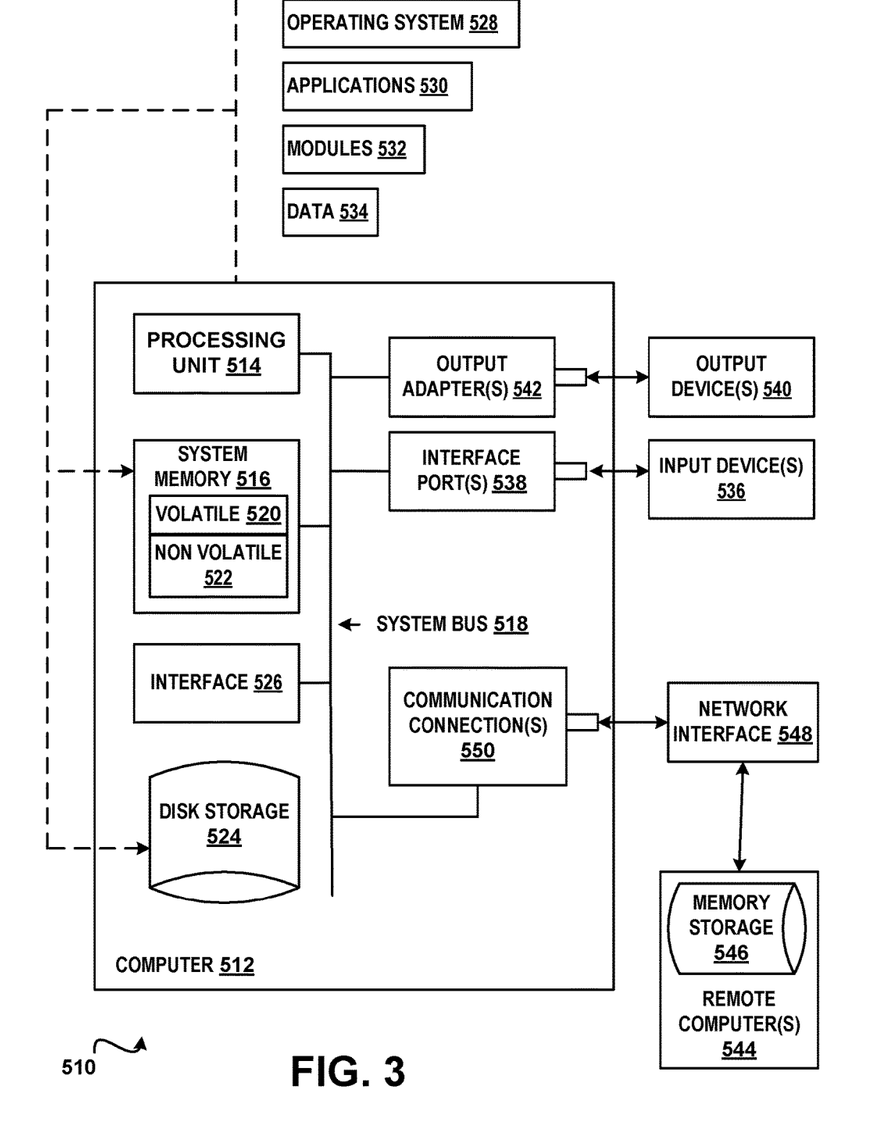
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-binary instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include binary instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
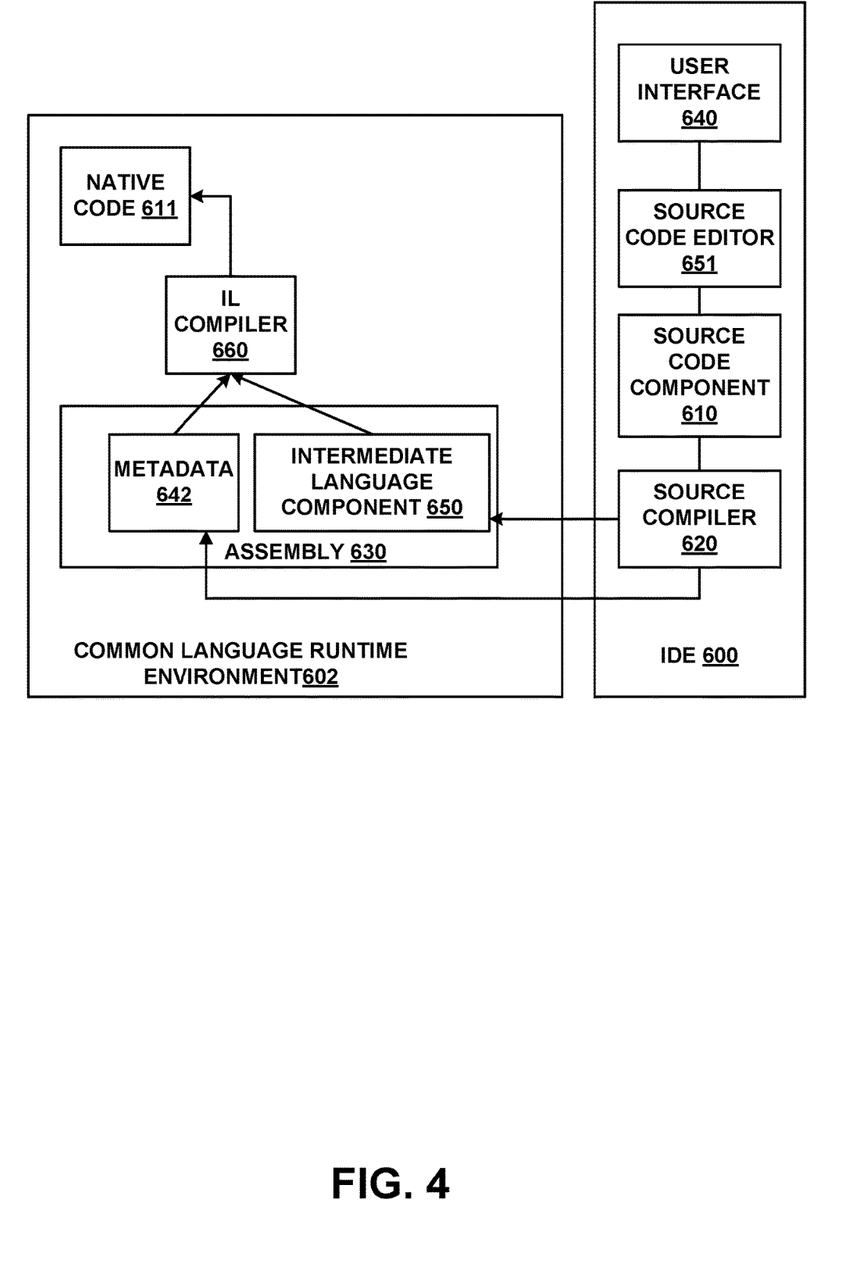
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine binary instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A front-end compiler, comprising:
an instrumenting module configured to:
receive information identifying at least one programming construct in a source code file;
receive instrumentation to be performed on the at least one programming construct in the source code file;
insert into a document table an identifier of the source code file and a location at which the at least one programming construct was found in the source code file;
store dynamic analysis information for an instrumented programming construct in an analysis table indexed by the location at which the at least one programming construct was found in the source code file; and
match an index of the document table and an index of the analysis table to provide an exact location in the source code file of the instrumented programming construct from which the dynamic analysis information was generated.

2. The front-end compiler of claim 1, wherein the document table comprises a source code file identifier.

3. The front-end compiler of claim 1, wherein the location in the source code file comprises a character position.

4. The front-end compiler of claim 3, wherein the location comprises a line and a column.

5. The front-end compiler of claim 3, wherein the location comprises a character offset from start of file.

6. The front-end compiler of claim 1, wherein an element N in the document table corresponding to a method M describes a text span for an instrumentation point represented by element N in an analysis table for the method M.

7. The front-end compiler of claim 1, wherein an instrumentation point receives a sequential number.

8. A method comprising:
receiving a document table, the document table comprising an identifier of a source code program, a method of the source code program, and a text span representing a location of a programming language construct in the source code program, the programming language construct comprising an instrumented programming language construct;
accessing dynamic analysis data collected during execution of the instrumented programming language construct in an analysis table indexed by instrumentation point;
matching an index of the document table and an index of the analysis table to determine an exact location of the programming language construct in the source code program; and
providing the exact location of the instrumented programming language construct in the source code program from which the dynamic analysis data was generated.

9. The method of claim 8, wherein the document table comprises a source code identifier, a method name and location information for the programming language construct in the source code program, the programming language construct instrumented at compile time.

10. The method of claim 8, wherein the method of the the source code program comprises a container for the programming language construct that is instrumented during compilation.

11. The method of claim 8, wherein each method of the source code program is associated with a set of tables, a set of tables comprising a respective document table and a respective analysis table.

12. The method of claim 8, wherein each method of the source code program is associated with a plurality of sets of tables, each set comprising a respective document table and a respective analysis table.

13. The method of claim 8, further comprising updating the analysis table with dynamic analysis information collected during execution of a binary created from the source code program.

14. A device for exactly matching analysis results with an exact location of a programming language construct in a source code file, the device comprising:
a memory; and
a processor, the processor configured to:
match instrumentation data collected at runtime to the exact location in the source code file at which the programming language construct that was instrumented at compile time is found by:
inserting into a document table an identifier of the source code file and a location in the source code file at which the programming language construct was found in the source code file;
storing dynamic analysis information for an instrumented programming language construct in an analysis table indexed by the location at which the programming language construct was found in the source code file; and providing the exact location of the programming language construct in the source code file for the dynamic analysis information.

15. The device of claim 14, wherein the processor is further configured to:

receive the document table.

16. The device of claim 15, wherein the processor is further configured to:

store instrumentation data collected at runtime in the analysis table.

17. The device of claim 16, wherein the processor is further configured to:

use an index for the instrumentation data in the analysis table as an index into the document table to retrieve the exact location of the programming language construct in the source code file.

18. The device of claim 14, wherein the processor is further configured to provide:

a text span in the source code file at which the programming language construct is found.

19. The device of claim 14, wherein the processor is further configured to map instrumentation results to the exact location in the source code file using the document table and the analysis table.

* * * * *